US011165796B2

(12) United States Patent
Marzorati et al.

(10) Patent No.: US 11,165,796 B2
(45) Date of Patent: *Nov. 2, 2021

(54) DETECTION OF MAN-IN-THE-MIDDLE IN HTTPS TRANSACTIONS INDEPENDENT OF CERTIFICATE TRUST CHAIN

(71) Applicant: International Business Machines Corporation, Armonk, NY (US)

(72) Inventors: Mauro Marzorati, Lutz, FL (US); Yaser K. Doleh, North Royalton, OH (US); Rosa M. Bolger, Austin, TX (US); Juraj Nyíri, Ivanka pri Nitre (SK)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/817,091

(22) Filed: Mar. 12, 2020

(65) Prior Publication Data
US 2020/0213335 A1    Jul. 2, 2020

Related U.S. Application Data

(63) Continuation of application No. 15/872,493, filed on Jan. 16, 2018, now Pat. No. 10,693,893.

(51) Int. Cl.
*H04L 29/06*    (2006.01)
*H04L 29/08*    (2006.01)

(52) U.S. Cl.
CPC ...... *H04L 63/1416* (2013.01); *H04L 63/1466* (2013.01); *H04L 63/166* (2013.01);
(Continued)

(58) Field of Classification Search
CPC . H04L 63/1416; H04L 67/2819; H04L 67/04; H04L 69/16; H04L 63/166; H04L 63/1466; H04L 67/02; H04L 63/1491
See application file for complete search history.

(56) References Cited

U.S. PATENT DOCUMENTS 8,055,587 B2 ‡  11/2011  Delia ................ H04L 63/0428
                                                           705/52
8,327,128 B1    12/2012  Prince et al.
(Continued)

FOREIGN PATENT DOCUMENTS

CN    102571770 A    7/2012
CN    103647783 A    3/2014

OTHER PUBLICATIONS

Durumeric, Z., et al., "The Security Impact of HTTPS Interception", NDSS'17, Feb. 26-Mar. 1, 2017, 14 pages.‡
(Continued)

*Primary Examiner* — Christopher A Revak
(74) *Attorney, Agent, or Firm* — Scully, Scott, Murphy & Presser, P.C.; Jeffrey S. LaBaw, Esq.

(57) ABSTRACT

Systems and computer program products implement methods for detecting a man-in-the-middle (MITM) during HTTPS communications. The methods include establishing a TCP connection for the retrieval of a web page from a domain name using an alternate IP address that is different from the IP address of the target domain where receipt of the target web page in response to a HTTP GET message indicates that a MITM is present, using a domain name as the SNI in a TLS connection and an alternate domain name in a HTTP GET message where receipt of a target web page of the alternate domain name indicates that a MITM is present, and generating an alternate domain name using a domain generation algorithm and using the generated alternate domain name as the SNI in the TLS message where receipt of a certificate for the generated alternate domain name indicates that a MITM is present.

25 Claims, 5 Drawing Sheets

(52) U.S. Cl.
CPC .......... *H04L 67/04* (2013.01); *H04L 67/2819* (2013.01); *H04L 69/16* (2013.01); *H04L 67/02* (2013.01)

(56) References Cited

U.S. PATENT DOCUMENTS

| | | | |
|---|---|---|---|
| 9,419,942 B1 | 8/2016 | Buruganahalli et al. | |
| 10,440,053 B2 | 10/2019 | Wyatt et al. | |
| 10,693,893 B2* | 6/2020 | Marzorati | H04L 63/1466 |
| 2008/0104672 A1‡ | 5/2008 | Lunde | H04L 63/1441 |
| | | | 726/3 |
| 2008/0295169 A1‡ | 11/2008 | Crume | H04L 63/1466 |
| | | | 726/22 |
| 2008/0318548 A1‡ | 12/2008 | Bravo | H04L 63/0853 |
| | | | 455/41 |
| 2009/0210712 A1‡ | 8/2009 | Fort | H04L 63/1441 |
| | | | 713/17 |
| 2010/0088766 A1‡ | 4/2010 | Michaely | H04L 63/1466 |
| | | | 726/23 |
| 2011/0302653 A1‡ | 12/2011 | Frantz | H04L 63/1408 |
| | | | 726/22 |
| 2014/0298415 A1 | 10/2014 | Xie et al. | |
| 2017/0012997 A1‡ | 1/2017 | Wu | H04L 63/12 |
| 2017/0171172 A1 | 6/2017 | Sullivan et al. | |
| 2019/0028439 A1 | 1/2019 | Moore | |
| 2019/0068556 A1 | 2/2019 | Perlmutter et al. | |
| 2020/0252426 A1* | 8/2020 | Lee | H04L 63/168 |
| 2020/0304476 A1* | 9/2020 | Moore | H04L 63/0464 |

OTHER PUBLICATIONS

Infosec Institute, "Domain Generation Algorithm (DGA)", http://resources.infosecinstitute.com/domain-generation-algorithm-dga/, Jun. 23, 2014, Accessed on Jan. 16, 2018, 11 pages.‡

Wikipedia, "Domain generation algorithm", https://en.wikipedia.org/wiki/Domain_generation_algorithm, Last Edited Dec. 12, 2017, Accessed on Jan. 16, 2018, 2 pages.‡

Blake-Wilson et al., "Transport Layer Security (TLS) Extensions", Jun. 2003, Network Working Group Request for Comments, The Internet Society, Jun. 2003, pp. 1-29.

Durumeric et al., "The Security Impact of HTTPS Interception", NDSS'17, Feb. 26-Mar. 1, 2017, 14 pages.

Infosec Institute, "Domain Generation Algorithm (DGA)", http://resources.inforsecinstitute.com/domain-generation-algorithm-dga/, Jun. 23, 2014, Accessed on Jan. 16, 2018, 11 pages.

List of IBM Patents or Patent Applications Treated As Related.

* cited by examiner
‡ imported from a related application

DETECTION OF MAN-IN-THE-MIDDLE IN HTTPS TRANSACTIONS INDEPENDENT OF CERTIFICATE TRUST CHAIN

BACKGROUND

The present disclosure relates to Hypertext Transfer Protocol Secure (HTTPS) communications and in particular to the detection of a man-in-the-middle (MITM) that may be attempting to monitor communications performed using HTTPS.

As HTTPS deployment grows, middlebox and antivirus products are increasingly intercepting Transport Layer Security (TLS) connections to retain visibility into network traffic. When it comes to HTTPS, the security community is working toward conflicting goals. On the one hand, the security community is committed to hardening and ubiquitously deploying HTTPS in order to provide strong end-to-end connection security. At the same time, middlebox and antivirus products increasingly intercept (i.e., terminate and re-initiate) HTTPS connections in an attempt to detect and block malicious content that uses the HTTPS protocol to avoid inspection. The advent of Server Name Indication (SNI) and self-signed root certificates installed on managed workstations weaken the overall security of the transport layer and therefore weaken HTTPS.

SNI is an extension to the TLS computer networking protocol which allows a client to indicate which hostname it is attempting to connect to at the start of the handshaking process. This is different from the original specification of TLS in which the client does not reveal any information prior to receiving the server's identity. SNI therefore allows a server to present multiple certificates on the same Internet Protocol (IP) address and Transmission Control Protocol (TCP) port number. This allows the server to service multiple secure, e.g., HTTPS, websites (or any other Service over TLS) using the same IP address without requiring all of the sites to use the same certificate. It is the conceptual equivalent to HTTP/1.1 name-based virtual hosting, but for HTTPS. In SNI, the desired hostname is not encrypted which allows an eavesdropper to see which site is being requested.

In cryptography and computer security, a self-signed certificate is an identity certificate that is signed by the same entity whose identity it certifies. This term has nothing to do with the identity of the person or organization that actually performed the signing procedure. In technical terms a self-signed certificate is a certificate signed with the private key of the sending entity. In typical public key infrastructure (PKI) arrangements, a digital signature from a certificate authority (CA) attests that a particular public key certificate is valid (i.e., contains correct information).

Domain generation algorithms (DGA) are algorithms that may be used to generate a large number of domain names. Often used in malware, DGAs can be used to generate rendezvous points as command and control servers for botnets to receive instructions. The large number of potential generated rendezvous points makes it difficult for other actors such as, e.g., law enforcement, to effectively track or shut down botnets since infected computers will attempt to contact a different set of these generated domain names every day to receive updates or commands. The generation of these domain names may be based on a variety of algorithms and based around one or more seeds. Often DGAs generate domain names having a high level of entropy, e.g., an apparently random set of numbers and letters. However, these domain names may be generated according to a pre-defined criteria that may be repeatable by more than one computing device to allow each computing device to access the same domain name for command and control instructions. An example DGA may generate a domain name based on, for example, time based parameters such as year, month, and day. For example, the DGA may implement an algorithm that inputs the year, month, and day and performs mathematical operations on each of the year, month, and day to modify the values, e.g., multiplication, addition, bitwise operations, or other mathematical operations. In some aspects, the output of the mathematical operations for one or more of the year, month, and day may be converted into another form, e.g., hexadecimal, and may be combined to generate the domain name. In some aspects, even the combined value may be adjusted by further mathematical operations. The output may then be appended to an appropriate domain identifier, e.g., .com, .net. etc. to form a domain name. The generated domain name may then be output from the DGA and used.

BRIEF SUMMARY

The system, method, and computer program product described herein may be used to identify the presence of a man-in-the-middle that is intercepting HTTPS communications between a browser and a web server.

In an aspect of the present disclosure, a method of detecting a man-in-the-middle (MITM) during HTTPS communications is disclosed. The method includes transmitting a query to a DNS for an IP address of a domain name, receiving, from the DNS, the IP address of the domain name, generating an alternate IP address different than the IP address of the domain name, transmitting a TCP message to the alternate IP address, receiving a TCP acknowledgement message from the alternate IP address, establishing a TCP connection with the alternate IP address in response to the received TCP acknowledgment, transmitting a TLS message using the TCP connection, a SNI of the TLS message including the domain name, receiving a TLS reply message including a certificate for the domain name, validating the received certificate, establishing a TLS connection in response to validation of the received certificate, and transmitting a HTTP GET message using the TLS connection. A URL of the HTTP GET message includes the domain name and a target web page associated with the domain name. The method further includes receiving a HTTP OK message including the target web page and determining that a man-in-the-middle is intercepting the HTTPS communications based on the receipt of the target web page.

In another aspect of the present disclosure, a method of detecting a man-in-the-middle (MITM) during HTTPS communications is disclosed. The method includes establishing a TCP connection to an IP address of a domain name, transmitting a TLS message using the TCP connection, a SNI of the TLS message including the domain name, receiving a TLS reply message including the certificate for the domain name, validating the received certificate, establishing a TLS connection in response to validation of the received certificate, and transmitting a HTTP GET message using the TLS connection. A URL of the HTTP GET message includes an alternate domain name and a target web page associated with the alternate domain name where the alternate domain name is different from the domain name. The method further includes receiving a HTTP OK message including the target web page and determining that a man-in-the-middle is intercepting the HTTPS communications based on the receipt of the target web page.

In another aspect of the present disclosure, a method of detecting a man-in-the-middle (MITM) during HTTPS communications is disclosed. The method includes establishing a TCP connection to an IP address of a domain name, generating an alternate domain name using a domain generation algorithm, transmitting a TLS message using the TCP connection, a SNI of the TLS message including the generated alternate domain name, receiving a TLS reply message including a certificate for the generated alternate domain name, and determining that a man-in-the-middle is intercepting the HTTPS communications based on the receipt of the certificate.

In aspects of the present disclosure, apparatus, systems, and computer program products in accordance with the above aspect may also be provided. Any of the above aspects may be combined without departing from the scope of the present disclosure.

BRIEF DESCRIPTION OF THE DRAWINGS

The details of the present disclosure, both as to its structure and operation, can be understood by referring to the accompanying drawings, in which like reference numbers and designations refer to like elements.

DETAILED DESCRIPTION

Because of the stacked nature of the TCP/IP protocol suite it is possible to craft transmission flows using mismatching settings at the TCP and TLS endpoints that may be used to detect a man-in-the-middle. Disclosed herein are specific methods of communicating using the HTTPS protocol that involve manipulation of the TCP, TLS, and HTTP settings in a manner that will expose an unseen MITM actor in what should be a single TCP flow between a browser of a computing device and a server. In some aspects, this may be done by manipulating the result from the Domain Name System (DNS) to create a test from a number of available conditions which leverage disjointed TCP, TLS, and HTTP instructions to reveal inspection points in the communication chain that may indicate a MITM should the transaction complete in an unexpected manner.

Figure 1:
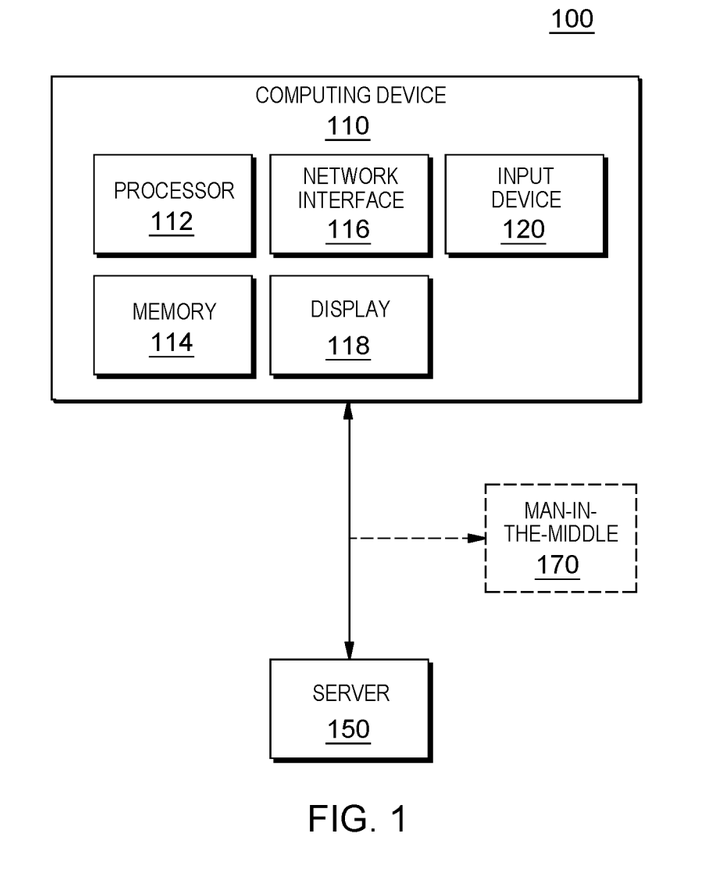
FIG. 1 is a system diagram illustrating a system for detecting the presence of a MITM in HTTPS protocol communications in accordance with some aspects of the present disclosure.

With reference now to FIG. 1, a system 100 for HTTPS communication between a computing device 110 and a server 150 is illustrated. In some aspects, system 100 includes a computing device 110 and a server 150. In some aspects, system 100 may also include a man-in-the-middle 170 that is attempting to intercept transmissions between computing deice 110 and server 150.

Computing device 110 includes at least one processor 112, memory 114, at least one network interface 116, a display 118, an input device 120, and may include any other features commonly found in a computing device. In some aspects, computing device 110 may, for example, be a computing device associated with a user that is configured to transmit and receive data from server 150 over an HTTPS connection. In some aspects, computing device 110 may include, for example, a personal computer, laptop, tablet, smart device, smart phone, smart watch, or any other similar computing device that may be used by a user.

Processor 112 may include, for example, a microcontroller, Field Programmable Gate Array (FPGAs), or any other processor that is configured to perform various operations. Processor 112 may be configured to execute instructions as described below. These instructions may be stored, for example, in memory 114.

Memory 114 may include, for example, computer readable media or computer readable storage media in the form of volatile memory, such as random access memory (RAM) and/or cache memory or others. Memory 114 may include, for example, other removable/non-removable, volatile/non-volatile storage media. By way of non-limiting examples only, memory 114 may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 116 is configured to transmit and receive data or information to and from a server 150 or any other computing device via wired or wireless connections. For example, network interface 116 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 110 to transmit or receive information to or from server 150.

Display 118 may include any display device that is configured to display information to a user of computing device 110. For example, in some aspects, display 118 may include a computer monitor, television, smart television, or other similar displays. In some aspects, display 118 may be integrated into or associated with computing device 110, for example, as a display of a laptop, smart phone, smart watch, or other smart wearable devices, as a virtual reality headset associated with computing device 110, or any other mechanism for displaying information to a user. In some aspects, display 118 may include, for example, a liquid crystal display (LCD), an e-paper/e-ink display, an organic LED (OLED) display, or other similar display technologies. In some aspects, display 118 may be touch-sensitive and may also function as an input device 120.

Input device 120 may include, for example, a keyboard, a mouse, a touch-sensitive display 118, a keypad, a microphone, or other similar input devices or any other input devices that may be used alone or together to provide a user with the capability to interact with computing device 110.

Server 150 may include a processor, memory, and a network interface that have similar functionality to processor 112, memory 114, and network interface 116. In some aspects, server 150 may, for example, be any computing device, server, or similar system that is configured to interact with or provide data to computing device 110. For example, server 150 may be a web server configured to transmit and receive data from computing device 110 related to a web page.

Man-in-the-middle 170 may be any computing device that is attempting to intercept communications between computing device 110 and server 150 and may include a processor, memory, and a network interface that have similar functionality to processor 112, memory 114, and network interface 116.

Figure 2:
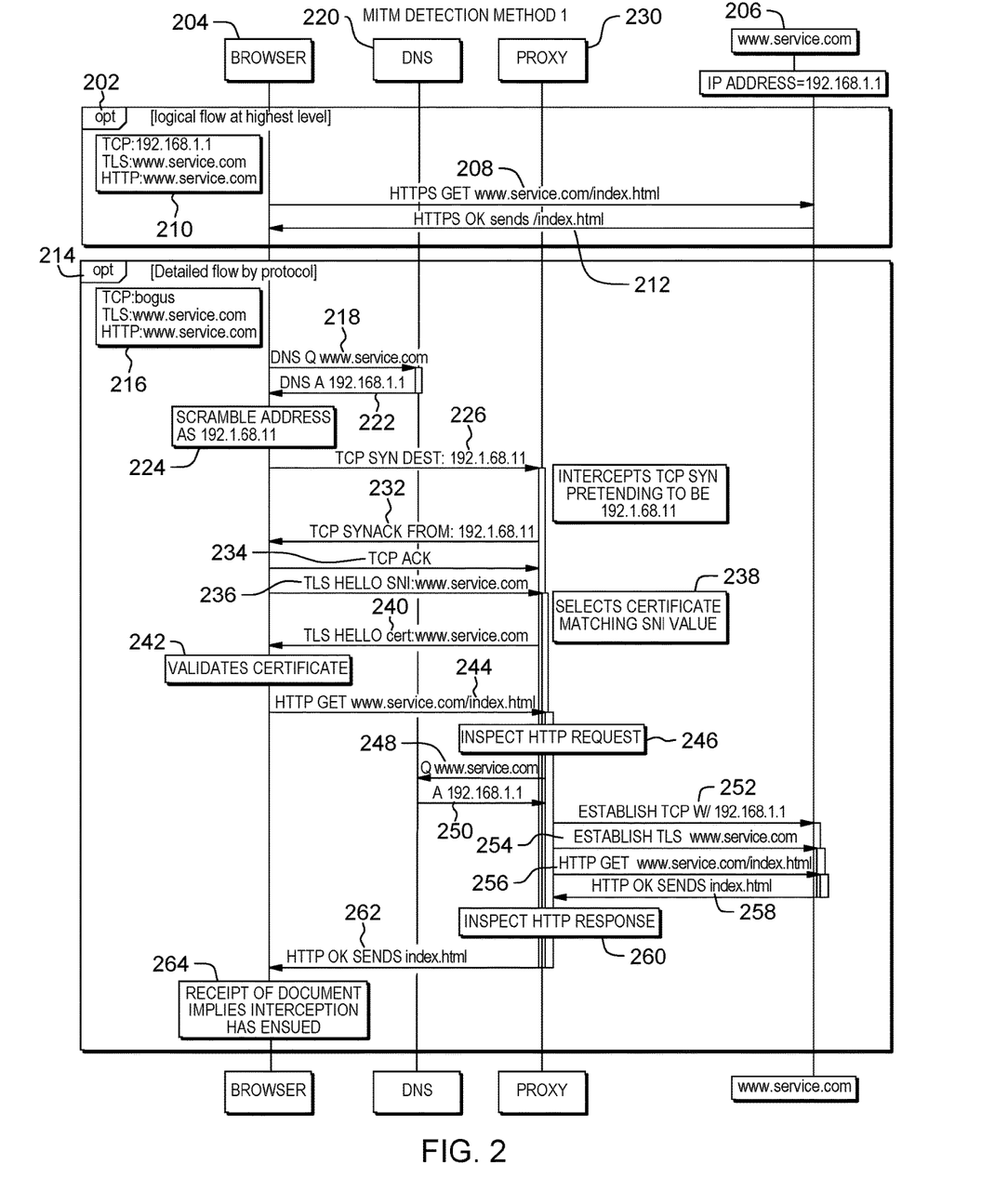
FIG. 2 is a flow diagram illustrating communications between a browser, a server, and a potential MITM in accordance with a first method of the present disclosure.

Man-In-The-Middle Detection Method 1:

With reference now to FIG. 2, a first method for detection of a man-in-the-middle (MITM) in a communication using the HTTPS protocol is disclosed.

At a high level, as illustrated in section 202, a HTTPS communication between a browser 204 of computing device 110 and a web server 206, e.g., www.service.com, may include the transmission of a HTTPS GET request 208 by the browser 204 to the web server 206 at an IP address specified in settings 2010. For example, the settings may include a TCP IP address of "192.168.1.1" for the web server 206, a TLS of "www.service.com", and an HTTP of "www.service.com". The HTTPS GET request 208 includes a Uniform Resource Locator (URL) "www.service.com/index.html" that identifies a requested html web page, e.g., "index.html".

In response to the HTTPS GET request, the web server 206, e.g., "www.service.com", having the IP address "192.168.1.1" will return a HTTPS OK transmission 212 including the "index.html" web page to the browser 204. The browser may then present the web page "index.html" to the user, e.g., via display 118.

Under normal conditions using the above communication protocol, a user of browser 204 would not know if a MITM is monitoring the communications between the browser 204 and web server 206 or that an MITM has intercepted their communications with the web server 206.

In section 214, a detailed flow by protocol of the communications involved in method 1 is illustrated that involves the use of a specific set of settings 216 for the communication between browser 204 and web server 206. The settings 216 are configured to allow a user of browser 204 to determine whether a MITM is intercepting communications between browser 204 and web server 206 by tricking the MITM into revealing itself. For example, in method 1, the user tricks the MITM to reveal itself by providing a combination of bogus and correct information in settings 216 which will elicit a response that would not otherwise have been received by the browser 204 from a web server 206 absent the presence of the MITM.

In the protocol, a DNS Q message 218 is transmitted to a domain name server (DNS) 220 including a web address for the target web server 206, e.g., "www.service.com".

In response to DNS Q message 218, the DNS 220 returns a DNS A message 222 including an IP address for the web server 206, e.g., 192.168.1.1.

The received IP address is then scrambled at 224 by the browser 204 to a different number, in this case, for example, 192.1.68.11, as a bogus IP address for the web server 206. The TCP IP address to be used for communicating with the web server 206 is therefore a bogus IP address of "192.1.68.11" instead of the correct IP address of "192.168.1.11" as returned from the DNS 220. The remaining settings 216 for the HTTPS protocol, e.g., a TLS domain name setting of "www.service.com" and a HTTP domain name setting of "www.service.com", are correct for the web server 206.

The browser 204 initiates a TCP 3-way handshake by transmitting a TCP SYN DEST message 226 to the bogus IP address "192.1.68.11" which is intercepted at 228 by a MITM proxy 230 pretending to be the bogus IP address "192.1.68.11".

In response to the TCP SYN DEST message 226, a TCP SYNACK message 232 is received by browser 204 from the MITM proxy 230 as if it were received from the bogus IP address "192.1.68.11". For example, there will be no indication in the received TCP SYNACK message 232 that the message was actually received from the MITM proxy 230 instead of the bogus IP address "192.1.68.11".

In response to the TCP SYNACK message 232, browser 204 transmits a TCP ACK message 234 to the bogus IP address "192.1.68.11" acknowledging receipt of the TCP SYNACK message 232. The TCP ACK message 234 is again intercepted by the MITM proxy 230, completing the 3-way handshake not with the web server 206 but instead with the MITM proxy 230. A TCP connection is now established between the browser 204 and MITM proxy 230. It is important to note that from the browser 204's point of view, the connection is between browser 204 and web server 206.

Next, the browser 204 initiates a TLS handshake by transmitting a TLS HELLO message 236 using the TCP connection including an SNI of "www.service.com". MITM proxy 230 intercepts the TLS HELLO message 236 and selects a certificate that has a matching SNI value at 238. The MITM proxy 230 then transmits a TLS HELLO message 240 to browser 204 including a certificate for "www.service.com".

In response to receiving the TLS HELLO message 240 including the certificate for "www.service.com", browser 204 validates the certificate at 242. The TLS handshake is complete and a TLS connection is established between the browser 204 and the MITM proxy 230. It is important to note that from the browser 204's point of view, the connection is between browser 204 and web server 206.

Once the certificate has been validated, browser 204 transmits a HTTP GET message 244 using the TLS connection including a URL "www.service.com/index.html".

Since the TLS connection is between browser 204 and MITM proxy 230, not browser 204 and web server 206, MITM proxy 230 intercepts the HTTP GET message 244, inspects the HTTP request at 246, and transmits a DNS Q message 248 to the DNS 220 to determine an IP address for the domain name (e.g., "www.service.com") of the URL. MITM proxy 230 receives from DNS 220 a DNS A message 250 including the correct IP address "192.168.1.1" for the domain name "www.service.com".

MITM proxy 230 may establish a TCP connection 252 with web server 206 based on the received correct IP address "192.168.1.1" and establish a TLS connection 254 with the web server 206 using the domain name "www.service.com".

Next MITM proxy 230 transmits a HTTP GET request 256 to web server 206 including the URL "www.service.com/index.html" and receives a HTTP OK message 258 including the web page "index.html".

MITM proxy 230 inspects the HTTP response and transmits a corresponding HTTP OK message 262 to the browser 204 including the web page "index.html".

Receipt of the web page "index.html" by browser 204 at 264 while using a bogus IP address in its TCP handshake communication implies that the communications between the browser 204 and web server 206 have been intercepted. For example, the user of browser 204, upon seeing the web page load or by monitoring the receipt of the web page, now knows that the communications between the browser 204 of the computing device 110 and the web server 206 are being intercepted.

This is because while the MITM proxy 230 intercepted the TCP SYN DEST message 226 that included the bogus IP address "192.1.68.11" and transmitted an acknowledgment as if it were a web server at the bogus IP address, the MITM proxy 230 independently determined the correct IP address for the web server 206 by querying the DNS 220 for the correct IP address of the domain name "www.service.com" indicated in the TLS SNI information, e.g., "192.168.1.1". The MITM proxy 230 then used the correct IP address when accessing the web server 206, and returned the web page back to the browser as if it had received the correct IP address from the browser 204 in the first place. In a normal communication between the browser 204 and web server 206 absent the MITM proxy 230, the bogus IP address would have been used and would have caused a failure or other error in the browser 204's attempt to communicate with the web server 206.

In some aspects, the browser 204 or computing device 110 may present the user with an indication, graphic, color, or other indicator, e.g., via display 118, that a MITM has been detected based on method 1.

Figure 3:
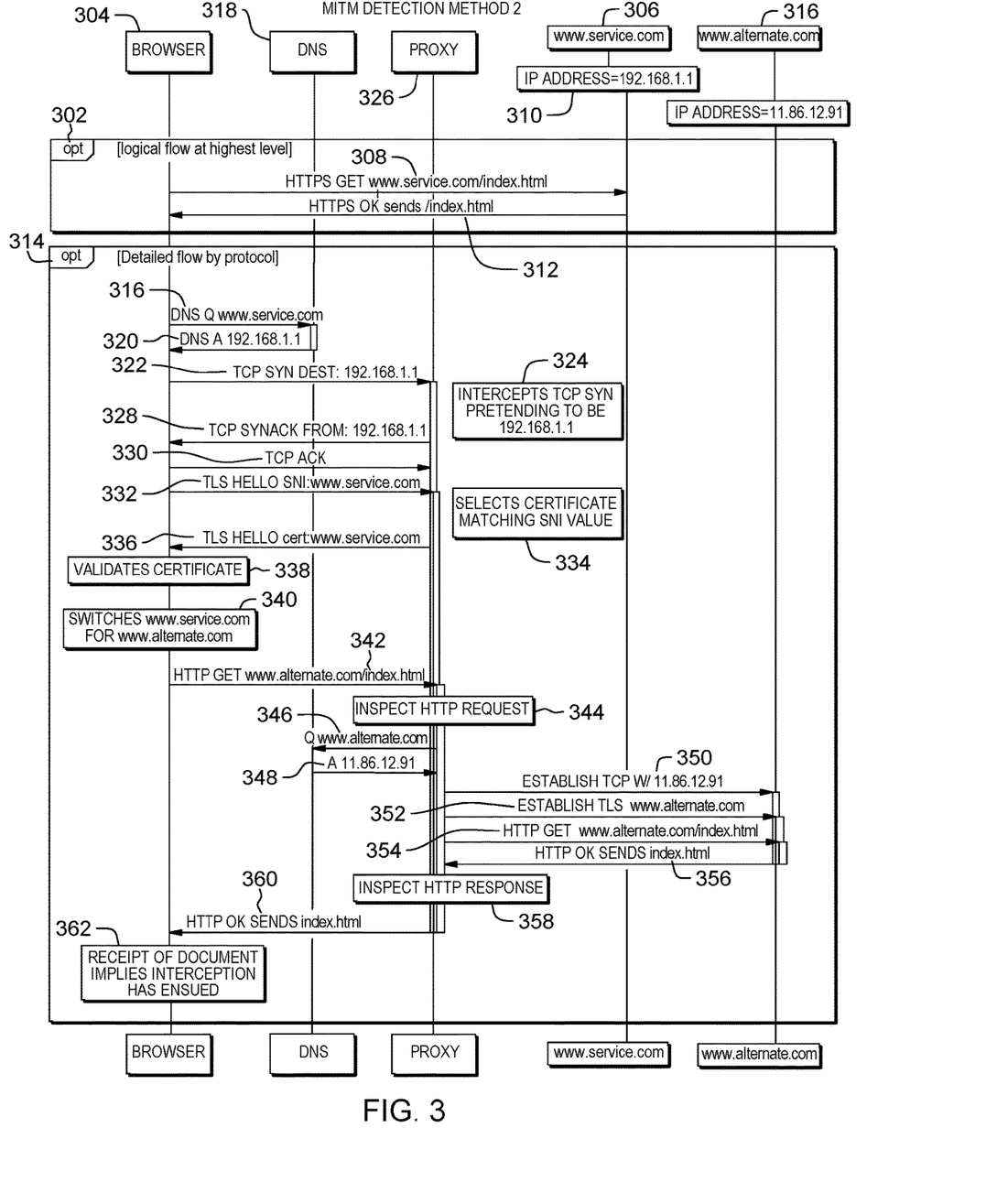
FIG. 3 is a flow diagram illustrating communications between a browser, a server, and a potential MITM in accordance with a second method of the present disclosure.

Man-In-The-Middle Detection Method 2:

With reference now to FIG. 3, a second method for detection of a man-in-the-middle (MITM) in a communication using the HTTPS protocol is disclosed.

At a high level, as illustrated in section 302, a HTTPS communication between a browser 304 of computing device 110 and a web server 306, e.g., www.service.com, may include the transmission of a HTTPS GET request 308 by the browser 304 to the web server 306 at an IP address 310 of the web server 306, e.g., "192.168.1.1". The HTTPS GET request 308 includes a URL "www.service.com/index.html" that identifies a requested html web page, e.g., "index.html".

In response to the HTTPS GET request, the web server 306, e.g., "www.service.com", having the IP address "192.168.1.1" will return a HTTPS OK transmission 312 including the "index.html" web page to the browser 306. The browser may then present the web page "index.html" to the user, e.g., via display 118.

Under normal conditions using the above communication protocol, a user of browser 304 would not know if a MITM is monitoring the communications between the browser 304 and web server 306 or that an MITM has intercepted their communications with the web server 306.

In section 314, a detailed flow by protocol of the communications involved in method 2 is illustrated that involves switching the domain name to be used during the communications in the HTTPS protocol between browser 304 and web server 306 to an alternate domain name. For example, the domain name may be switched from the domain name of web server 306, e.g., "www.service.com" to an alternate domain name of another web server 316, e.g., "www.alternate.com". In some aspects, the alternate domain name may be a domain name that does corresponds to a known web server such that any content received may be confirmed to be related to the known web server. In some aspects, the alternate domain name may be a domain name that does not correspond to any web server.

Switching the domain name to an alternate domain name allows a user of browser 304 to determine whether a MITM is intercepting communications between browser 304 and web server 306 by tricking the MITM into revealing itself. For example, in method 2, the user tricks the MITM to reveal itself by providing a first domain name during the TCP and TLS communications, and an alternate domain name during the HTTP GET request which will elicit a response that would not otherwise have been received by the browser 304 from a web server 306 absent the presence of the MITM.

In the protocol, a DNS Q message 316 is transmitted to a domain name server (DNS) 318 including a web address for the target web server 306, e.g., "www.service.com".

In response to DNS Q message 316, the DNS 318 returns a DNS A message 320 including an IP address for the web server 206, e.g., "192.168.1.1".

The browser 304 initiates a TCP 3-way handshake by transmitting a TCP SYN DEST message 322 to the received IP address "192.168.1.1" which is intercepted at 324 by a MITM proxy 326 pretending to be the IP address "192.168.1.1".

In response to the TCP SYN DEST message 322, a TCP SYNACK message 328 is received by browser 304 from the MITM proxy 326 as if it were received from the IP address "192.168.1.1". For example, there will be no indication in the received TCP SYNACK message 324 that the message was actually received from the MITM proxy 326 instead of the IP address "192.168.1.1".

In response to the TCP SYNACK message 328, browser 304 transmits a TCP ACK message 330 to the IP address "192.168.1.1" acknowledging receipt of the TCP SYNACK message 232. The TCP ACK message 330 is again intercepted by the MITM proxy 326, completing the 3-way handshake not with the web server 306 but instead with the MITM proxy 326. A TCP connection is now established between the browser 304 and MITM proxy 326. It is important to note that from the browser 304's point of view, the connection is between browser 304 and web server 306.

Next, the browser 304 initiates a TLS handshake by transmitting a TLS HELLO message 332 using the TCP connection including an SNI of "www.service.com". MITM proxy 326 intercepts the TLS HELLO message 332 and selects a certificate that has a matching SNI value at 334. The MITM proxy 326 then transmits a TLS HELLO message 336 to browser 304 including a certificate for "www.service.com".

In response to receiving the TLS HELLO message 336 including the certificate for "www.service.com", browser 304 validates the certificate at 338. The TLS handshake is complete and a TLS connection is established between the browser 304 and the MITM proxy 326. It is important to note that from the browser 304's point of view, the TLS connection is between browser 304 and web server 306.

Once the browser 304 has validated the certificate, browser 304 switches the domain name to be used in the HTTPS communications from "www.service.com" to an alternate domain name, e.g., "www.alternate.com" at 340.

Browser 304 continues following the protocol by transmitting a HTTP GET message 342 using the TLS connection including a URL "www.alternate.com/index.html" having the alternate domain name.

Since the TLS connection is between browser 304 and MITM proxy 326, not browser 304 and web server 306, MITM proxy 326 intercepts the HTTP GET message 342, inspects the HTTP request at 344, and transmits a DNS Q message 346 to the DNS 318 to determine an IP address for web server 316 hosting the alternate domain name "www.alternate.com". MITM proxy 236 receives from DNS 218 a DNS A message 348 including the IP address "11.86.12.91" for the web server 316 hosting the alternate domain name "www.alternate.com".

MITM proxy 236 establishes a TCP connection 350 with web server 316 based on the received IP address "11.86.12.91" and establishes a TLS connection 352 with the web server 206 based on the domain name "www.alternate.com".

Next MITM proxy 236 transmits a HTTP GET request 354 to web server 316 including the URL "www.alternate.com/index.html" and receives a HTTP OK message 356 including the web page "index.html" of the alternate domain name "www.alternate.com".

MITM proxy 236 inspects the HTTP response at 358 and transmits a corresponding HTTP OK message 360 to the browser 304 including the web page "index.html" of the alternate domain name "www.alternate.com".

Receipt by browser 304 at 362 of the web page "index.html" for the alternate domain name "www.alternate.com" instead of the web page "index.html" for the domain name specified in the SNI of the TLS HELLO message 332 after switching the domain name to be used by the HTTP GET request 342 implies that the communications between the browser 304 and web server 306 have been intercepted. For example, the user of browser 304, upon seeing the web page of the alternate domain name from web server 316 load or by monitoring the receipt of the web page, now knows that the communications between the browser 304 of the computing device 110 and the web server 306 are being intercepted by a MITM.

This is because while the MITM proxy 316 intercepted the TCP SYN DEST message 322 that included the IP address "192.168.1.1" for the web server 306 and transmitted an acknowledgment as if it were a web server 306 at the IP address, and the MITM proxy 316 also intercepted the TLS HELLO message 332 including the SNI for the domain name "www.service.com" and transmitted a TLS HELLO message 336 including a certificate for the domain name "www.service.com", the MITM proxy 316 independently determined the IP address associated with the alternate domain name submitted in the HTTP GET request 342, e.g., the IP address of the web server associated with the domain name "www.alternate.com" and returned the web page "index.html" associated with the alternate domain name.

Receiving a valid certificate that matches the SNI value of the original domain name "www.service.com" while receiving a web page "index.html" associated with the alternate domain name "www.alternate.com" indicates to the user that a MITM is present since such a discrepancy would not be present if the browsers 304 was communicating directly with the target web server, e.g., web server 306. For example, a web server 306 of a domain "www.service.com" would not transmit a web page "index.html" from an alternate domain "www.alternate.com" in response to an HTTP GET message 342 including the alternate domain in the URL.

In some aspects, the browser 304 or computing device 110 may present the user with an indication, graphic, color, or other indicator, e.g., via display 118, that a MITM has been detected based on method 2.

Man-In-The-Middle Detection Method 3:

With reference to FIGS. 2 and 3, in some aspects, a third method for detecting a MITM in communication using the HTTPS protocol may include a combination of method 1 and method 2 as described above. For example, in method 3 the browser may scramble the IP address as in method 1, e.g., to "192.1.68.11", and may also switch the domain name as in method 2, e.g., from "www.service.com" to "www.alternative.com".

In some aspects, the combination of methods 1 and 2 may be performed in sequence where, for example, the communications included in method 1 may be followed by the communications in method 2. In some aspects, the communications in method 2 may alternatively be followed by the communications in method 1.

During HTTPS communications according to method 1, as described above, receipt of an HTTP OK message 262 that includes the web page "index.html" for the domain name "www.service.com" by the browser implies or indicates that a MITM is intercepting the communications.

During HTTPS communications according to method 2, as described above, receipt of an HTTP OK message that includes the web page "index.html" for the domain name "www.alternate.com" by the browser implies or indicates that a MITM is intercepting the communications.

If the results of both methods 1 and 2 imply that a MITM is intercepting communications, the combination of methods 1 and 2 provides further confirmation that a MITM is intercepting communications.

If the result of one of methods 1 and 2 does not imply that a MITM is intercepting communications, for example, an error is received or another expected result is received that would be otherwise be present absent the MITM, but the other of methods 1 and 2 does imply that a MITM is intercepting communications, the combination of methods 1 and 2 may be used for the detection of a MITM that may be tricked into revealing itself by only one of the methods but not the other. This provides an additional layer of security in knowing whether a MITM is present and intercepting communications.

If the result of both methods 1 and 2 do not imply that a MITM is intercepting communications, the user may be provided with additional assurance that a MITM is not present.

In some aspects, method 3 may layer on both strategies of methods 1 and 2 in the same set of communications for tricking the MITM into revealing itself. For example, method 3 may scramble the IP address to "198.1.68.11", as in method 1, and then switch the domain name from "www.service.com" to "www.alternative.com", as in method 2, during the same set of HTTPS communications. Receipt of an HTTP OK message that includes the web page "index.html" for the domain name "www.alternate.com" or for the domain name "www.service.com" by the browser implies or indicates that a MITM is intercepting the communications.

In some aspects, the browser or computing device 110 may present the user with an indication, graphic, color, or other indicator, e.g., via display 118, that a MITM has been detected based on method 3.

Figure 4:
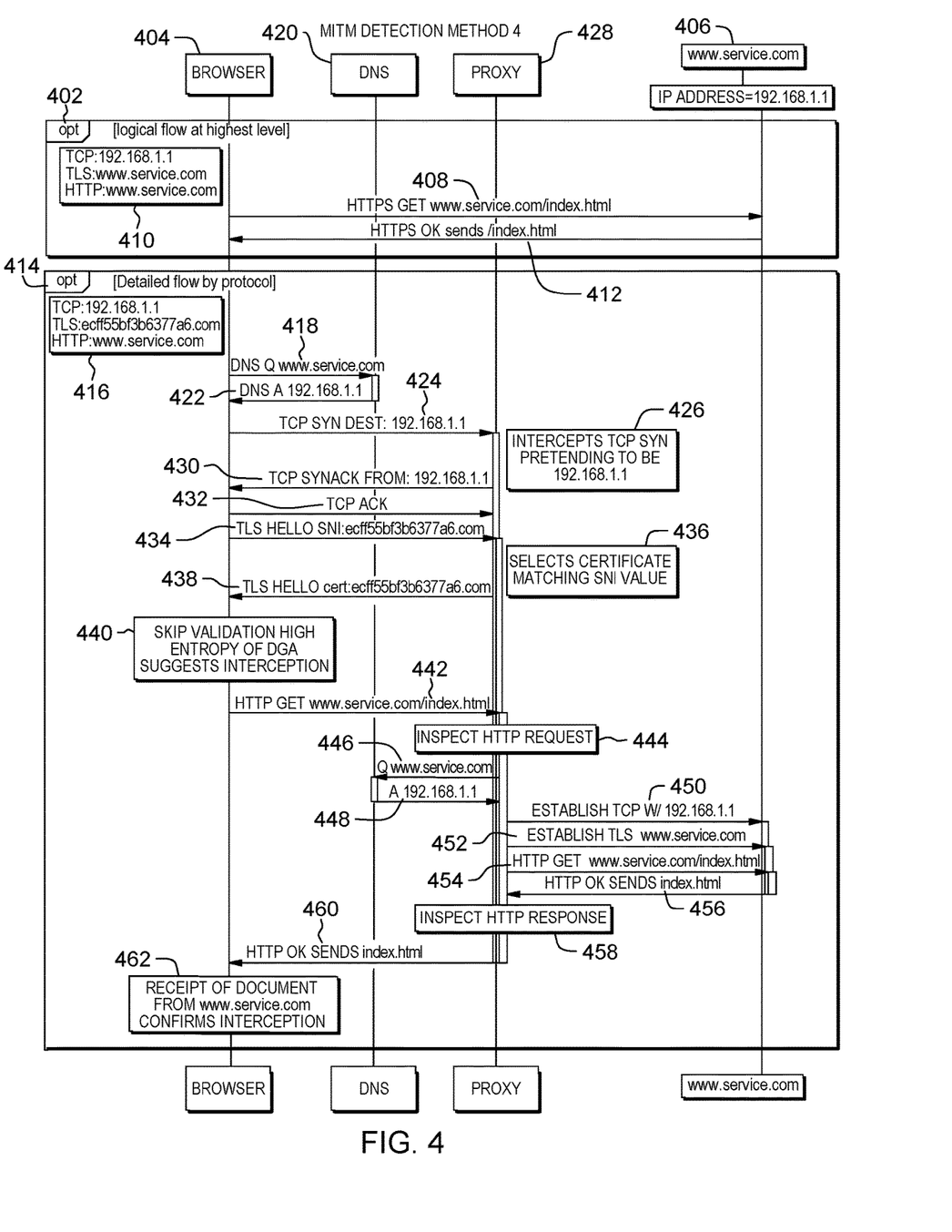
FIG. 4 is a flow diagram illustrating communications between a browser, a server, and a potential MITM in accordance with a fourth method of the present disclosure.

Man-In-The-Middle Detection Method 4:

With reference now to FIG. 4, a fourth method for detection of a man-in-the-middle (MITM) in a communication using the HTTPS protocol is disclosed.

At a high level, as illustrated in section 402, a HTTPS communication between a browser 404 of computing device 110 and a web server 406, e.g., www.service.com, may include the transmission of a HTTPS GET request 408 by the browser 404 to the web server 406 at an IP address specified in settings 410. For example, the settings may include a TCP IP address of "192.168.1.1" for the web server 406, a TLS of "www.service.com", and an HTTP of "www.service.com". The HTTPS GET request 408 includes a URL "www.service.com/index.html" that identifies a requested html web page, e.g., "index.html".

In response to the HTTPS GET request 408, the web server 406, e.g., "www.service.com", having the IP address "192.168.1.1" will return a HTTPS OK transmission 412 including the "index.html" web page to the browser 404. The browser may then present the web page "index.html" to the user, e.g., via display 118.

Under normal conditions using the above communication protocol, a user of browser 404 would not know if a MITM is monitoring the communications between the browser 404 and web server 406 or that an MITM has intercepted their communications with the web server 406.

In section 414, a detailed flow by protocol of the communications involved in method 4 is illustrated that involves the use of a specific set of settings 416 for the communication between browser 404 and web server 406. The settings 416 are configured to allow a user of browser 404 to determine whether a MITM is intercepting communications between browser 404 and web server 406 by tricking the MITM into revealing itself. For example, in method 4, the user tricks the MITM to reveal itself by using an alternative domain name generated using a DGA for the TLS SNI. The generated alternative domain name will have a large amount of entropy, e.g., appear to be a random sequence of number and letters such as "ecff55bf3b6377a6.com", such that any TLS certificate received by the browser 404 that matches the alternative domain name will instantly suggest to the browser 404 and user of computing device 110 that a MITM is present and intercepting the communications. In addition, interception may be further confirmed by actually receiving the web page "index.html" for the domain name "www.service.com" from the MITM in response to an HTTPS GET request as described in more detail below. When using such a generated alternative domain name which would elicit a response that would not otherwise have been received by the browser 404 from a web server 406 absent the presence of the MITM, the presence of the MITM may be confirmed.

In the protocol, a DNS Q message 418 is transmitted to a domain name server (DNS) 420 including a web address for the target web server 406, e.g., "www.service.com".

In response to DNS Q message 418, the DNS 420 returns a DNS A message 422 including an IP address for the web server 406, e.g., 192.168.1.1.

The browser 404 initiates a TCP 3-way handshake by transmitting a TCP SYN DEST message 424 to the IP address "192.168.1.1" which is intercepted at 426 by a MITM proxy 428 pretending to be the IP address "192.168.1.1".

In response to the TCP SYN DEST message 4224, a TCP SYNACK message 430 is received by browser 404 from the MITM proxy 428 as if it were received from the IP address "192.168.1.1". For example, there will be no indication in the received TCP SYNACK message 430 that the message was actually received from the MITM proxy 428 instead of the IP address "192.168.1.1".

In response to the TCP SYNACK message 430, browser 404 transmits a TCP ACK message 432 to the IP address "192.168.1.1" acknowledging receipt of the TCP SYNACK message 430. The TCP ACK message 432 is again intercepted by the MITM proxy 428, completing the 3-way handshake not with the web server 406 but instead with the MITM proxy 428. A TCP connection is now established between the browser 404 and MITM proxy 428. It is important to note that from the browser 404's point of view, the connection is between browser 404 and web server 406.

Next, the browser 404 initiates a TLS handshake by transmitting a TLS HELLO message 434 using the TCP connection including an SNI of "ecff55bf3b6377a6.com", the domain name generated by the DGA. MITM proxy 428 intercepts the TLS HELLO message 434 and selects a certificate that has a matching SNI value at 436. The MITM proxy 428 then transmits a TLS HELLO message 438 to browser 404 including a certificate for "ecff55bf3b6377a6.com".

Since the browser 404 knows that the domain name "ecff55bf3b6377a6.com" is a generated domain name, reception of a certificate for the "ecff55bf3b6377a6.com" indicates that a MITM is intercepting the communications between the browser 404 and the web server 406. Accordingly, no validation of the certificate is necessary. Regardless, browser 404 considers the TLS handshake as complete and a TLS connection is established between the browser 404 and the MITM proxy 428. Unlike previous methods, at this point the browser 404 knows that a MITM proxy 428 is intercepting communications. Regardless, browser 404 continues with the HTTPS communications as if it has established a TLS connection with web server 406.

Next, browser 404 transmits a HTTP GET message 442 using the TLS connection including a URL "www.service.com/index.html".

Since the TLS connection is between browser 404 and MITM proxy 428, not browser 404 and web server 406, MITM proxy 428 intercepts the HTTP GET message 442, inspects the HTTP request at 444, and transmits a DNS Q message 446 to the DNS 420 to determine an IP address for the domain name (e.g., "www.service.com") of the URL.

MITM proxy 428 receives from DNS 220 a DNS A message 448 including the IP address "192.168.1.1" for the domain name "www.service.com" in response to the DNS Q message 446.

MITM proxy 428 then establishes a TCP connection 450 with web server 406 based on the received IP address "192.168.1.1" and establishes a TLS connection 452 with the web server 406 based on the domain name "www.service.com".

Next MITM proxy 428 transmits a HTTP GET request 454 to web server 406 including the URL "www.service.com/index.html" and receives a HTTP OK message 456 including the web page "index.html".

MITM proxy 428 inspects the HTTP response at 458 and transmits a corresponding HTTP OK message 460 to the browser 404 including the web page "index.html".

Receipt of the web page "index.html" by browser 404 at 462 confirms that the communications between the browser 404 and web server 406 have been intercepted. For example, the user of browser 404, upon seeing the web page load or by monitoring the receipt of the web page, now knows that the communications between the browser 404 of the computing device 110 and the web server 406 are being intercepted.

This is because while the MITM proxy 428 intercepted the TLS HELLO message 434 that included the DGA generated domain name "ecff55bf3b6377a6.com" and transmitted a certificate for the generated domain name back to browser 404, which on its own may indicate an interception, the MITM proxy 428 further determined the IP address for the web server 206 by querying the DNS 420 for the domain name "www.service.com", instead of the generated domain name "ecff55bf3b6377a6.com" indicated in the TLS SNI information. The MITM proxy 428 then used the IP address for the domain name "www.service.com" when accessing the web server 406, and returned the web page back to the browser as if it had received the domain name "www.service.com" in the SNI from the browser 404 in the first place.

In a normal communication between the browser 404 and web server 406 absent the MITM proxy 428, the generated domain name would have been used and would have caused a failure or other error in the browser 404's attempt to communicate with the web server 406 to retrieve the web page.

In some aspects, the browser 404 or computing device 110 may present the user with an indication, graphic, color, or other indicator, e.g., via display 118, that a MITM has been detected based on method 4.

Man-In-The-Middle Detection Method 5:

With reference to FIGS. 3 and 4, in some aspects, a fifth method for detecting a MITM in communication using the HTTPS protocol may include a combination of the DGA from method 4 with the domain name switching of method 2 as described above. For example, in method 5 the browser may transmit a DNS Q message 418 to DNS 420 for a domain name, e.g., "www.service.com", and receive a corresponding IP address of "192.168.1.1" from DNS 420 in a DNS A message 422 generate a domain name, e.g., "ecff55bf3b6377a6.com" using the DGA, transmit the TLS HELLO message 434 including the generated domain name as the SNI value, as described above for method 4. Receipt of a certificate matching the generated domain name by the browser, e.g., in TLS HELLO message 438 may indicate that the communications are being intercepted by a MITM.

Next the browser may switch from the generated domain name to an alternate domain name, e.g., "www.alternate.com" in a similar manner to in method 2 at 340 and transmit the HTTP GET message 342 including the alternate domain name.

Receipt of the web page "index.html" for the alternate domain name "www.alternate.com" in a HTTP OK message 360 further confirms that the communications are being intercepted by a MITM as described above in method 2.

Any of Man-In-The-Middle detection methods 1-5 as described above may be combined either in the same HTTPS communication or in multiple HTTPS communications without departing from the scope of the present disclosure.

Figure 5:
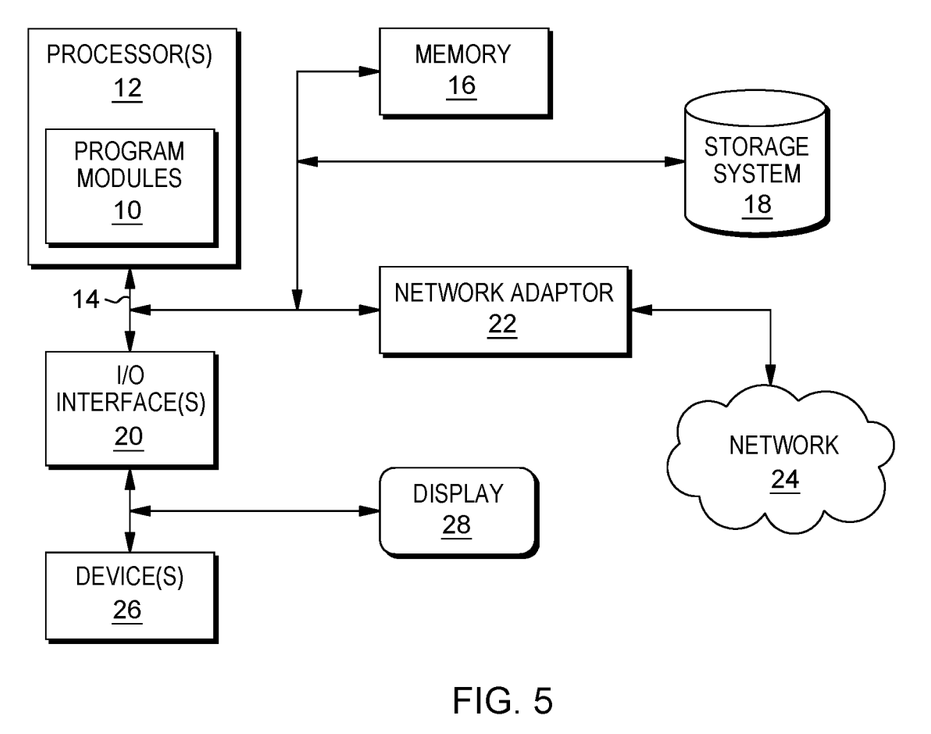
FIG. 5 is an exemplary block diagram of a computer system in which processes involved in the system, method, and computer program product described herein may be implemented.

FIG. 5 illustrates a schematic of an example computer or processing system that may implement any portion of system 100, computing device 110, server 150, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system of detecting a man-in-the-middle (MITM) during HTTPS communications between a computing device and a server, the system comprising:
one or more storage devices associated with said computing device; and
one or more hardware processors coupled to the one or more storage devices;
the one or more hardware processors of said computing device configured as a browser, said browser establishing a TCP connection to an IP address of a domain name associated with said server;
the browser of said computing device transmitting a TLS message using the TCP connection, a SNI of the TLS message including the domain name associated with said server;
the browser of said computing device receiving a TLS reply message including the certificate for the domain name;
the browser of said computing device validating the received certificate;
the browser of said computing device establishing a TLS connection in response to the validation of the received certificate;
the browser of said computing device transmitting a HTTP GET message using the TLS connection, a URL of the HTTP GET message including an alternate domain name and a target web page associated with the alternate domain name, the alternate domain name being different from the domain name;
the browser of said computing device receiving a HTTP OK message including the target web page; and
the browser of said computing device determining that a man-in-the-middle is intercepting the HTTPS communications based on the receipt of the target web page.

2. The system of claim 1, wherein the browser of said computing device presents an indication to a user via a display that a man-in-the-middle is intercepting the HTTPS communications based on the determination.

3. The system of claim 1, wherein to establish the TCP connection, browser of said computing device:
transmits a query to a domain name server (DNS) for the IP address of a domain name;
receives, from the DNS, the IP address of the domain name;
transmits a TCP message to the IP address of the domain name;
receives a TCP acknowledgement message from the IP address of the domain name; and
establishes a TCP connection in response to the received TCP acknowledgment.

4. The system of claim 1, wherein to establish the TCP connection:
the browser of said computing device transmits a query to a domain name server (DNS) for an IP address of a domain name;
the browser of said computing device receives, from the DNS, the IP address of the domain name;
the browser of said computing device generates an alternate IP address that is different from the IP address of the domain name, said alternate IP address associated with another server;
the browser of said computing device transmits a TCP message to the alternate IP address;
an intercepting proxy server receives a TCP acknowledgement message from the another server at the alternate IP address; and
the intercepting proxy server establishes the TCP connection with the another server at the alternate IP address in response to receipt of the TCP acknowledgment message.

5. The system of claim 1, wherein:
the browser of said computing device generates an alternate IP address different than the IP address of the domain name;
the browser of said computing device establishes a second TCP connection with another server associated with the alternate IP address;
the browser of said computing device transmits a second TLS message using the second TCP connection, a SNI of the second TLS message including the domain name;
the browser of said computing device receives a second TLS reply message including a certificate for the domain name;
the browser of said computing device validates the certificate received with the second TLS reply message;
the browser of said computing device establishes a second TLS connection in response to validation of the certificate received with the second TLS reply message;
the browser of said computing device transmitting a second HTTP GET message using the second TLS connection, a URL of the second HTTP GET message including the domain name and a second target web page associated with the domain name; and
the browser of said computing device receiving a second HTTP OK message including the second target web page,
the browser of said computing device determining that a man-in-the-middle is intercepting the HTTPS communications based on the receipt of the second target web page.

6. The system of claim 5, wherein to generate the alternate IP address, the browser of said computing device scrambles the numbers in the IP address of the domain name.

7. A system of detecting a man-in-the-middle (MITM) during HTTPS communications between a computing device and a server, the system comprising:
one or more storage devices associated with said computing device;
one or more hardware processors coupled to the one or more storage devices;
the one or more hardware processors of said computing device configured as a browser, said browser establishing a TCP connection to an IP address of a domain name;
the browser of said computing device generating an alternate domain name using a domain generation algorithm;
the browser of said computing device transmitting a TLS message using the TCP connection, a SNI of the TLS message including the generated alternate domain name;
the browser of said computing device receiving a TLS reply message including a certificate for the generated alternate domain name; and
the browser of said computing device determining that a man-in-the-middle is intercepting the HTTPS communications based on the receipt of the certificate.

8. The system of claim 7, wherein the browser of said computing device presents an indication to a user via a display that a man-in-the-middle is intercepting the HTTPS communications based on the determination.

9. The system of claim 7, wherein the browser of said computing device generates the alternate domain name having a high level of entropy.

10. The system of claim 7, wherein to establish the TCP connection, the browser of said computing device:
transmits a query to a domain name server (DNS) for an IP address of a domain name;
receives, from the DNS, the IP address of the domain name;
transmits a TCP message to the IP address of the domain name;
receives a TCP acknowledgement message from the IP address of the domain name; and
establishes the TCP connection with the IP address in response to receipt of the TCP acknowledgment message.

11. The system of claim 7, wherein to establish the TCP connection, the browser of said computing device:
transmits a query to a domain name server (DNS) for an IP address of a domain name;
receives, from the DNS, the IP address of the domain name;
generates an alternate IP address that is different from the IP address of the domain name;
transmits a TCP message to the alternate IP address;
receives a TCP acknowledgement message from the alternate IP address; and
establishes the TCP connection with the alternate IP address in response to receipt of the TCP acknowledgment message.

12. The system of claim 7, wherein:
the browser of said computing device establishes a TLS connection in response to receipt of the certificate;
the browser of said computing device transmits a HTTP GET message using the TLS connection, a URL of the HTTP GET message including the domain name and a target web page associated with the domain name; and
the browser of said computing device receives a HTTP OK message including the target web page,
wherein the determination that a man-in-the-middle is intercepting the HTTPS communications is also based on the receipt of the target web page.

13. The system of claim 7, wherein:
the browser of said computing device establishes a TLS connection in response to receipt of the certificate;
the browser of said computing device transmits a HTTP GET message using the TLS connection, a URL of the HTTP GET message including the alternate domain name and a target web page associated with the alternate domain name, the alternate domain name being different than the domain name; and
the browser of said computing device receives a HTTP OK message including the target web page,
wherein the determination that a man-in-the-middle is intercepting the HTTPS communications is also based on the receipt of the target web page.

14. A computer readable storage medium storing a program of instructions executable by a machine to perform a method of detecting a man-in-the-middle (MITM) during HTTPS communications, the method comprising:
transmitting a query to a DNS for an IP address of a domain name;
receiving, from the DNS, the IP address of the domain name;
generating an alternate IP address different than the IP address of the domain name;
transmitting a TCP message to the alternate IP address;
receiving a TCP acknowledgement message from the alternate IP address;
establishing a TCP connection with the alternate IP address in response to the received TCP acknowledgment;
transmitting a TLS message using the TCP connection, a SNI of the TLS message including the domain name;
receiving a TLS reply message including a certificate for the domain name;
validating the received certificate;
establishing a TLS connection in response to validation of the received certificate;
transmitting a HTTP GET message using the TLS connection, a URL of the HTTP GET message including the domain name and a target web page associated with the domain name;
receiving a HTTP OK message including the target web page; and
determining that a man-in-the-middle is intercepting the HTTPS communications based on the receipt of the target web page.

15. The computer readable storage medium of claim 14, wherein the program of instructions are executable by the machine to further perform:
transmitting a second TCP message to the IP address of the domain name;
receiving a second TCP acknowledgement message from the IP address of the domain name;
establishing a second TCP connection in response to the received second TCP acknowledgment;
transmitting a second TLS message using the second TCP connection, a SNI of the second TLS message including the domain name;
receiving a second TLS reply message including a certificate for the domain name;
validating the certificate received with the second TLS reply message for the domain name;
establishing a second TLS connection in response to validation of the certificate received with the second TLS reply message;
transmitting a second HTTP GET message using the second TLS connection, a URL of the second HTTP GET message including an alternate domain name and a second target web page associated with the alternate domain name, the alternate domain name being different from the domain name; and
receiving a second HTTP OK message including the second target web page, wherein the determination that a man-in-the-middle is intercepting the HTTPS communications is also based on the receipt of the second target web page.

16. A computer readable storage medium storing a program of instructions executable by a machine to perform a method of detecting a man-in-the-middle (MITM) during HTTPS communications, the method comprising:
establishing a TCP connection to an IP address of a domain name;
transmitting a TLS message using the TCP connection, a SNI of the TLS message including the domain name;
receiving a TLS reply message including the certificate for the domain name;
validating the received certificate;
establishing a TLS connection in response to validation of the received certificate;
transmitting a HTTP GET message using the TLS connection, a URL of the HTTP GET message including an alternate domain name and a target web page associated with the alternate domain name, the alternate domain name being different from the domain name;

receiving a HTTP OK message including the target web page; and determining that a man-in-the-middle is intercepting the HTTPS communications based on the receipt of the target web page.

17. The computer readable storage medium of claim 16, wherein to establish the TCP connection, the program of instructions are executable by the machine to further perform:

transmitting a query to a DNS for the IP address of a domain name;

receiving, from the DNS, the IP address of the domain name;

transmitting a TCP message to the IP address of the domain name;

receiving a TCP acknowledgement message from the IP address of the domain name; and establishing a TCP connection in response to the received TCP acknowledgment.

18. The computer readable storage medium of claim 16, wherein to establish the TCP connection, the program of instructions are executable by the machine to further perform:

transmitting a query to a DNS for an IP address of a domain name;

receiving, from the DNS, the IP address of the domain name;

generating an alternate IP address that is different from the IP address of the domain name;

transmitting a TCP message to the alternate IP address;

receiving a TCP acknowledgement message from the alternate IP address; and establishing the TCP connection with the alternate IP address in response to receipt of the TCP acknowledgment message.

19. The computer readable storage medium of claim 16, wherein the program of instructions are executable by the machine to further perform:

generating an alternate IP address different than the IP address of the domain name;

establishing a second TCP connection to the alternate IP address;

transmitting a second TLS message using the second TCP connection, a SNI of the second TLS message including the domain name;

receiving a second TLS reply message including a certificate for the domain name;

validating the certificate received with the second TLS reply message;

establishing a second TLS connection in response to validation of the certificate received with the second TLS reply message;

transmitting a second HTTP GET message using the second TLS connection, a URL of the second HTTP GET message including the domain name and a second target web page associated with the domain name; and receiving a second HTTP OK message including the second target web page, wherein the determination that a man-in-the-middle is intercepting the HTTPS communications is also based on the receipt of the second target web page.

20. A computer readable storage medium storing a program of instructions executable by a machine to perform a method of detecting a man-in-the-middle (MITM) during HTTPS communications, the method comprising:

establishing a TCP connection to an IP address of a domain name;

generating an alternate domain name using a domain generation algorithm;

transmitting a TLS message using the TCP connection, a SNI of the TLS message including the generated alternate domain name;

receiving a TLS reply message including a certificate for the generated alternate domain name; and determining that a man-in-the-middle is intercepting the HTTPS communications based on the receipt of the certificate.

21. The computer readable storage medium of claim 20, wherein the generated alternate domain name has a high level of entropy.

22. The computer readable storage medium of claim 20, wherein to establish the TCP connection, the program of instructions are executable by the machine to further perform:

transmitting a query to a DNS for an IP address of a domain name;

receiving, from the DNS, the IP address of the domain name;

transmitting a TCP message to the IP address of the domain name;

receiving a TCP acknowledgement message from the IP address of the domain name; and establishing the TCP connection with the IP address in response to receipt of the TCP acknowledgment message.

23. The computer readable storage medium of claim 20, wherein to establish the TCP connection, the program of instructions are executable by the machine to further perform:

transmitting a query to a DNS for an IP address of a domain name;

receiving, from the DNS, the IP address of the domain name;

generating an alternate IP address that is different from the IP address of the domain name;

transmitting a TCP message to the alternate IP address;

receiving a TCP acknowledgement message from the alternate IP address; and establishing the TCP connection with the alternate IP address in response to receipt of the TCP acknowledgment message.

24. The computer readable storage medium of claim 20, wherein the program of instructions are executable by the machine to further perform:

establishing a TLS connection in response to receipt of the certificate;

transmitting a HTTP GET message using the TLS connection, a URL of the HTTP GET message including the domain name and a target web page associated with the domain name; and receiving a HTTP OK message including the target web page, wherein the determination that a man-in-the-middle is intercepting the HTTPS communications is also based on the receipt of the target web page.

25. The computer readable storage medium of claim 20, wherein the program of instructions are executable by the machine to further perform:

establishing a TLS connection in response to receipt of the certificate;

transmitting a HTTP GET message using the TLS connection, a URL of the HTTP GET message including the alternate domain name and a target web page associated with the alternate domain name, the alternate domain name being different than the domain name; and receiving a HTTP OK message including the target web page, wherein the determination that a man-in-the-middle is intercepting the HTTPS communications is also based on the receipt of the target web page.

\* \* \* \* \*